US012605829B2

(12) United States Patent
Tago

(10) Patent No.: US 12,605,829 B2
(45) Date of Patent: Apr. 21, 2026

(54) ROBOT SYSTEM AND WORKPIECE SUPPLY METHOD

(71) Applicant: FANUC CORPORATION, Yamanashi (JP)

(72) Inventor: Mizuki Tago, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 184 days.

(21) Appl. No.: 18/273,824

(22) PCT Filed: Feb. 4, 2022

(86) PCT No.: PCT/JP2022/004451
§ 371 (c)(1),
(2) Date: Jul. 24, 2023

(87) PCT Pub. No.: WO2022/172873
PCT Pub. Date: Aug. 18, 2022

(65) Prior Publication Data
US 2024/0300102 A1 Sep. 12, 2024

(30) Foreign Application Priority Data

Feb. 12, 2021 (JP) ................................. 2021-020699

(51) Int. Cl.
*B25J 9/16* (2006.01)
*B25J 13/08* (2006.01)

(52) U.S. Cl.
CPC ........... *B25J 9/1633* (2013.01); *B25J 9/1612* (2013.01); *B25J 13/082* (2013.01)

(58) Field of Classification Search
CPC ...... B25J 13/082; B25J 9/1612; B25J 9/1633; G05B 2219/39322; G05B 2219/39529;
(Continued)

(56) References Cited

U.S. PATENT DOCUMENTS 6,317,653 B1 * 11/2001 Kamiya ................. B25J 9/1633
414/730
6,785,584 B2 * 8/2004 Yoshikawa .......... G05B 19/182
700/192
(Continued)

FOREIGN PATENT DOCUMENTS

JP          S57114387 A   *   7/1982
JP          2002187040 A   *   7/2002   ........... G05B 19/182
(Continued)

OTHER PUBLICATIONS

Translation of JP 2002187040 A (Year: 2002).*
(Continued)

*Primary Examiner* — Adam R Mott
*Assistant Examiner* — James Miller Watts, III
(74) *Attorney, Agent, or Firm* — Nakanishi IP Associates, LLC

(57) ABSTRACT
A robot system includes a robot device for supplying a workpiece to a machine tool, a hand attached to a distal end of an arm of the robot device, a force sensor for detecting an external force applied to the hand, and a robot control device for controlling the robot device. The robot control device includes an operation control unit for controlling the robot device to correct the position and posture of the hand with respect to the machine tool, based on an output of the force sensor, and a storage unit to store data relating to the corrected position and posture of the hand.

4 Claims, 9 Drawing Sheets

(58) Field of Classification Search
CPC .......... G05B 2219/40582; G05B 2219/40586;
G05B 2219/40599
See application file for complete search history.

(56)                   References Cited

U.S. PATENT DOCUMENTS

| | | | | |
|---|---|---|---|---|
| 2011/0301741 A1* | 12/2011 | Kayani | ............... | B25J 11/0055 |
| | | | | 901/30 |
| 2016/0089789 A1* | 3/2016 | Sato | ....................... | B25J 13/088 |
| | | | | 700/254 |
| 2016/0116017 A1 | 4/2016 | Ebihara | | |
| 2016/0263747 A1 | 9/2016 | Yokoi | | |
| 2019/0248006 A1 | 8/2019 | Takahashi | | |

FOREIGN PATENT DOCUMENTS

| | | | |
|---|---|---|---|
| JP | 2016-84838 A | 5/2016 |
| JP | 2016-168651 A | 9/2016 |
| JP | 2019-136860 A | 8/2019 |
| TW | M554404 U | 1/2018 |

OTHER PUBLICATIONS

Translation of JPS57114387A (Year: 1982).*
International Search Report issued in PCT/JP2022/004451 mailed on Apr. 5, 2022 with English Translation (5 pages).
Written Opinion of International Searching Authority issued in PCT/JP2022/004451 mailed on Apr. 5, 2022 with English Translation (7 pages).

* cited by examiner

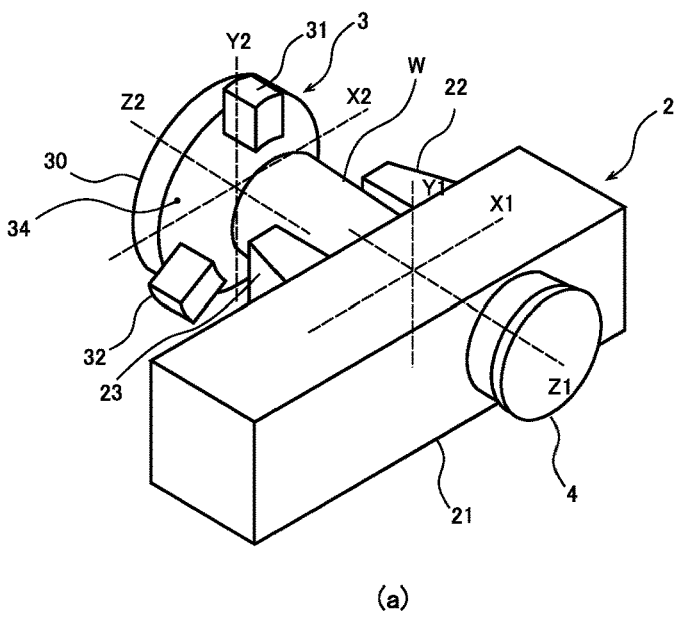
(a)
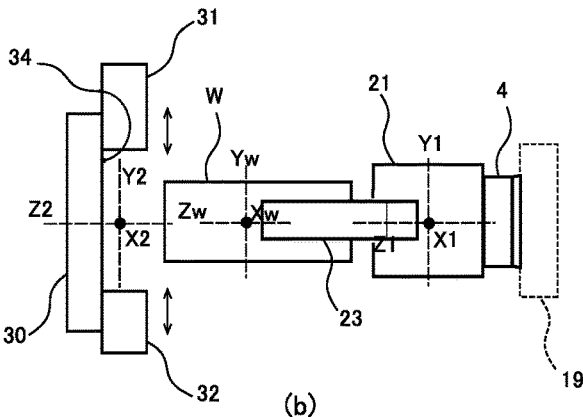
(b)
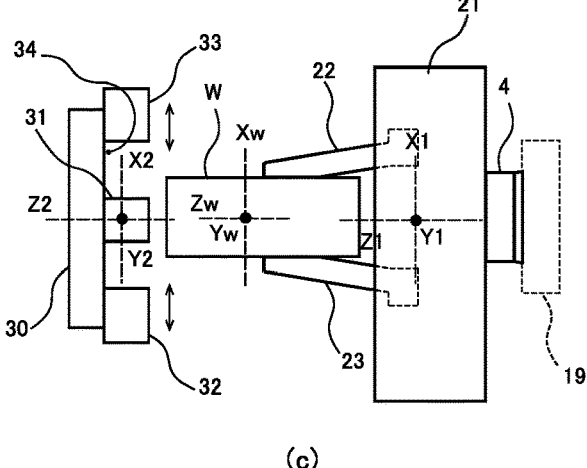
(c)
Fig.2

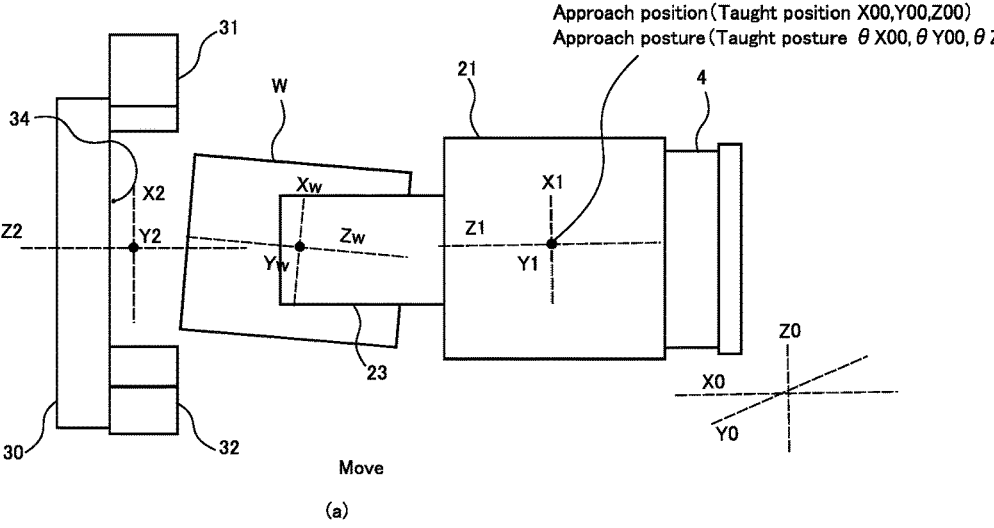
Move
(a)
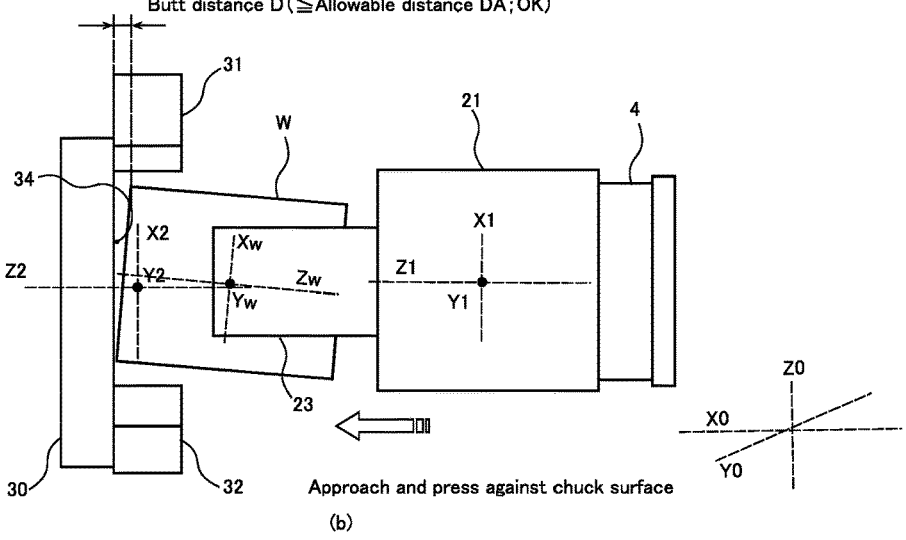
Approach and press against chuck surface
(b)
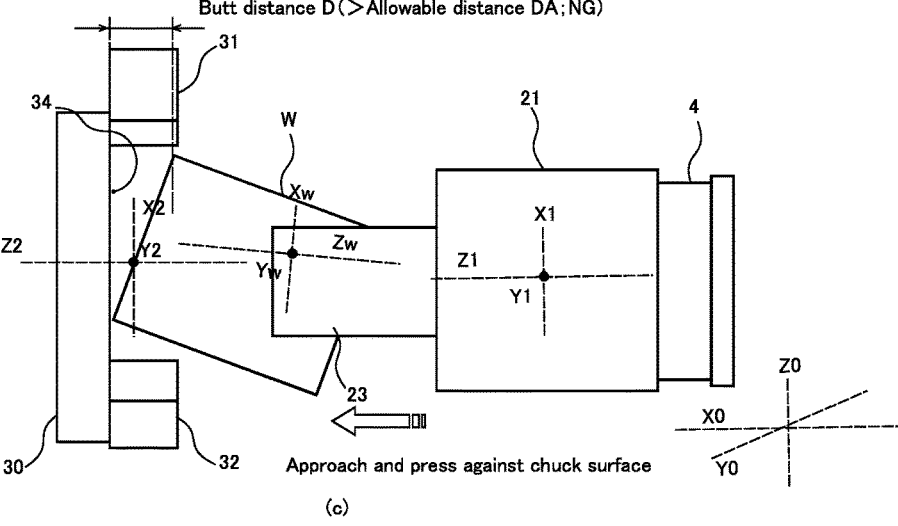
Approach and press against chuck surface
(c)
Fig.5

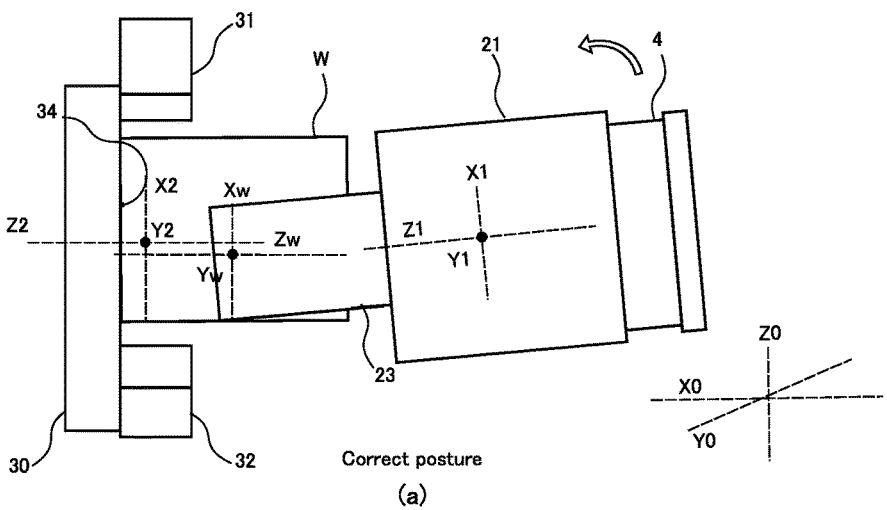
Correct posture
(a)
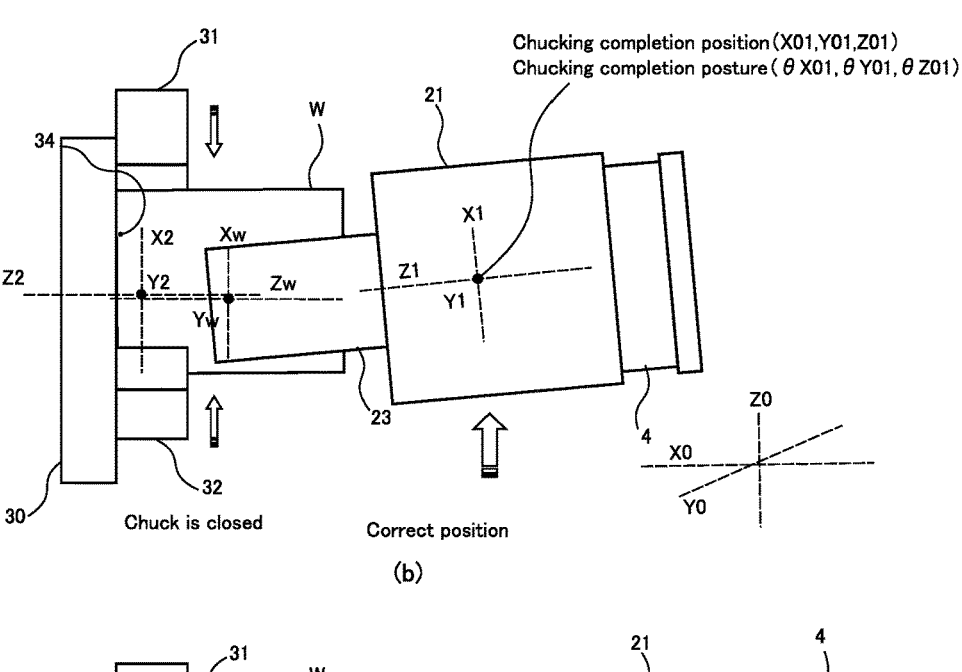
Chucking completion position (X01,Y01,Z01)
Chucking completion posture (θX01, θY01, θZ01)
Chuck is closed     Correct position
(b)
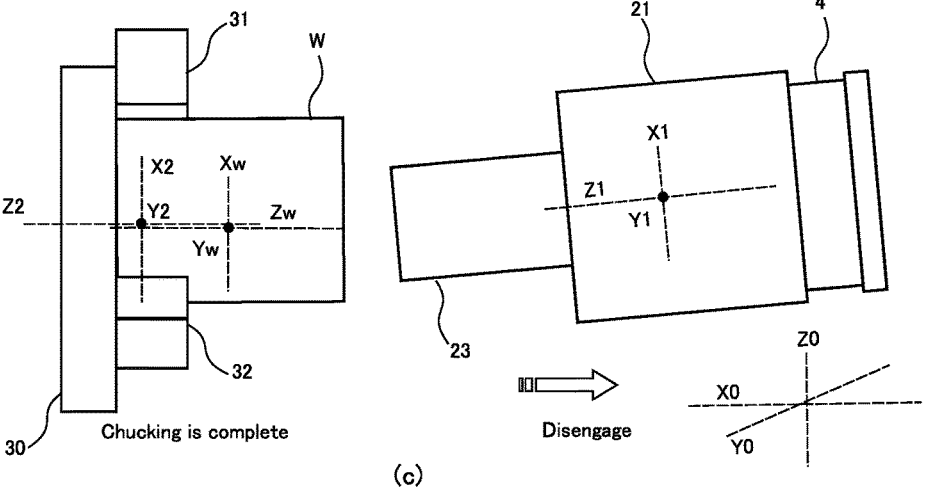
Chucking is complete     Disengage
(c)
Fig.6

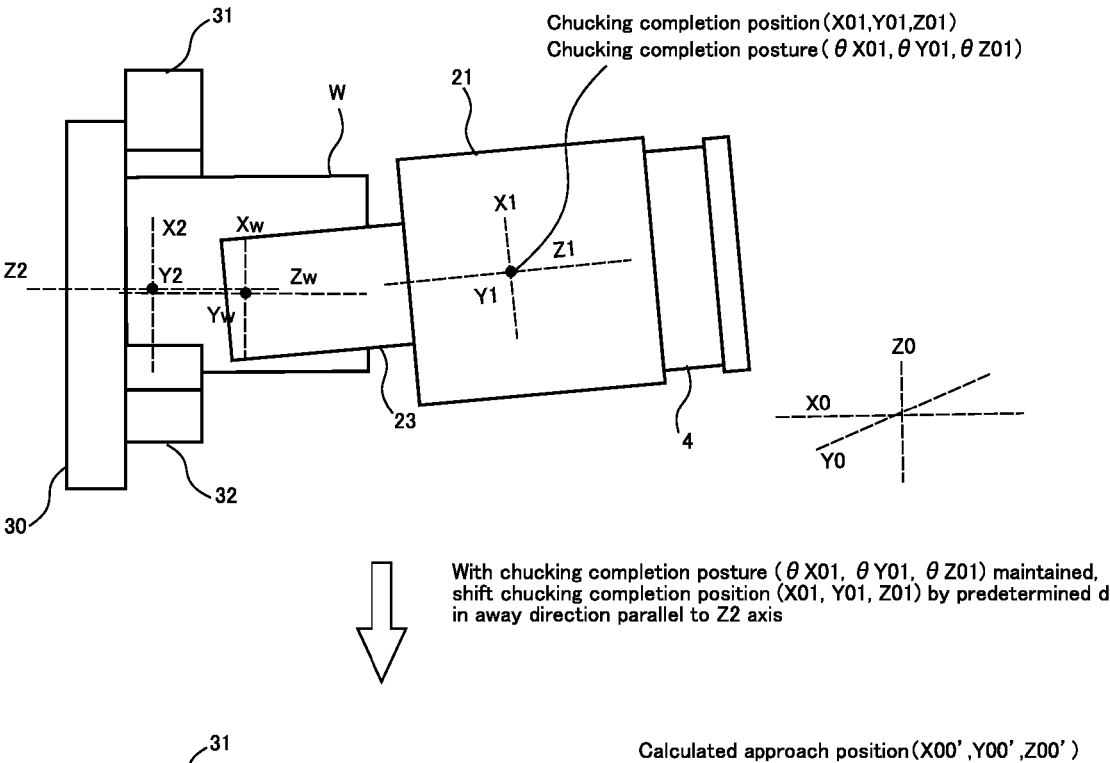

Chucking completion position (X01,Y01,Z01)
Chucking completion posture ( $\theta$ X01, $\theta$ Y01, $\theta$ Z01)

With chucking completion posture ( $\theta$ X01, $\theta$ Y01, $\theta$ Z01) maintained,
shift chucking completion position (X01, Y01, Z01) by predetermined distance
in away direction parallel to Z2 axis

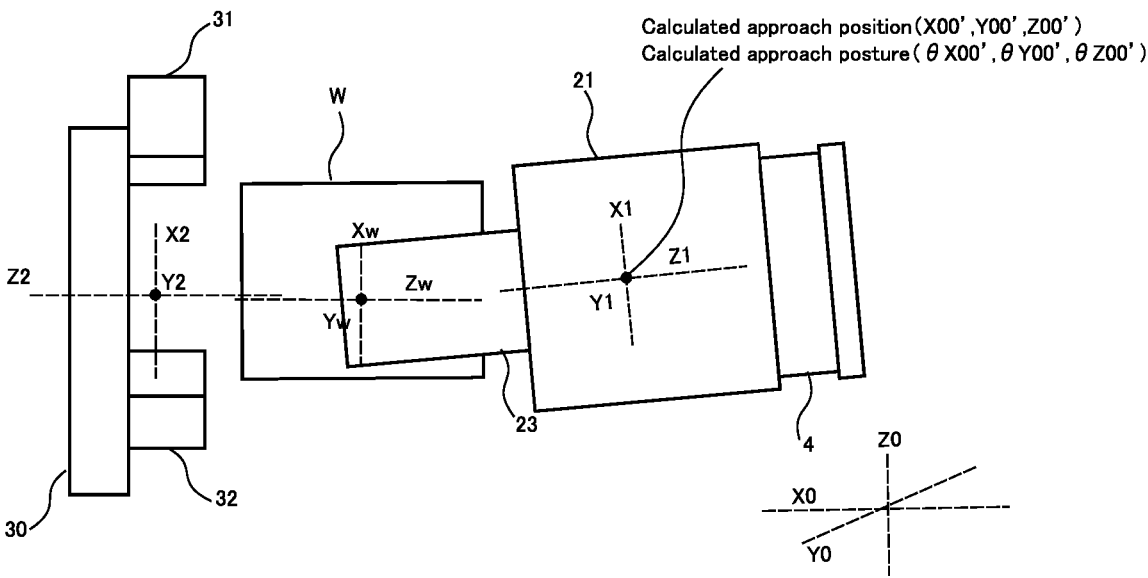

Calculated approach position (X00',Y00',Z00')
Calculated approach posture ( $\theta$ X00', $\theta$ Y00', $\theta$ Z00')

Fig.7

ROBOT SYSTEM AND WORKPIECE SUPPLY METHOD

TECHNICAL FIELD

Embodiments described herein relate generally to a robot system and a workpiece supply method.

BACKGROUND

A robot device is often used to supply a workpiece to be machined to a chuck mechanism installed in a machine tool. When the robot device supplies a workpiece to the chuck mechanism, the robot device moves to a previously taught position in a previously taught posture, makes the workpiece butt against the chuck surface, and waits for completion of chucking.

However, due to the tolerance of the outer shape of the workpiece, if the workpiece is large, an excessive external force acts between the chuck surface of the machine tool and the workpiece gripped by the hand, and if the workpiece is small, a gap is generated between the chuck surface and the workpiece. In addition, if the center line of the workpiece gripped by the hand does not coincide with the center line of the chuck, the hand gripping the workpiece is pressed when the chuck is closed, and an excessive external force is applied to the link and rotary joint of the arm of the robot device, the hand, and the chuck mechanism. As a result, the link and rotary joint of the robot device, the robot hand, and the chuck mechanism of the machine tool may be damaged. In addition, if there is a gap between the chuck surface and the workpiece, the workpiece vibrates during machining, resulting in a problem that high-precision machining cannot be performed.

Therefore, there is a method of correcting the posture of the workpiece with respect to the chuck surface by imaging the workpiece gripped by the hand of the robot with a camera. However, with this correction method, the center line of the chuck and the center line of the workpiece do not coincide with each other when the detected workpiece is not a perfect circle, for example, because the workpiece is a casting. In addition, since the distance from the gripping position of the workpiece to the butt surface of the chuck and the inclination of the bottom surface of the workpiece cannot be accurately detected by the camera, an excessive external force or a gap may be generated between the chuck surface and the workpiece.

There is also a method of monitoring the current value of a motor of a robot mechanism part and correcting the posture of the robot based on a disturbance value detected from the current value. However, with this correction method, when the external force of the workpiece is detected from the current value of the motor, some error is included; therefore, it is difficult to completely minimize the force between the hand and the chuck. In addition, another drawback exists that the workpiece can be held only in a fixed posture since the ease of detecting the current value of the motor varies depending on the posture of the robot.

In general, after the workpiece is set in the taught approach position and posture, the workpiece is brought close to the chuck mechanism of the machine tool, but at that time, the position and posture of the workpiece need to be adjusted with respect to the chuck surface, so that the cycle time is lengthened in accordance with the adjustment time.

BRIEF DESCRIPTION OF THE DRAWINGS

FIG. 2 is a view showing the hand shown in FIG. 1 together with a workpiece and a chuck mechanism of a machine tool.

FIG. 5 is a supplementary explanatory diagram of steps S2 to S4 shown in FIG. 4.

FIG. 6 is a supplementary explanatory diagram of steps S6 to S12 shown in FIG. 4.

FIG. 7 is a supplementary explanatory diagram of step S13 shown in FIG. 4.

DETAILED DESCRIPTION

Figure 1:
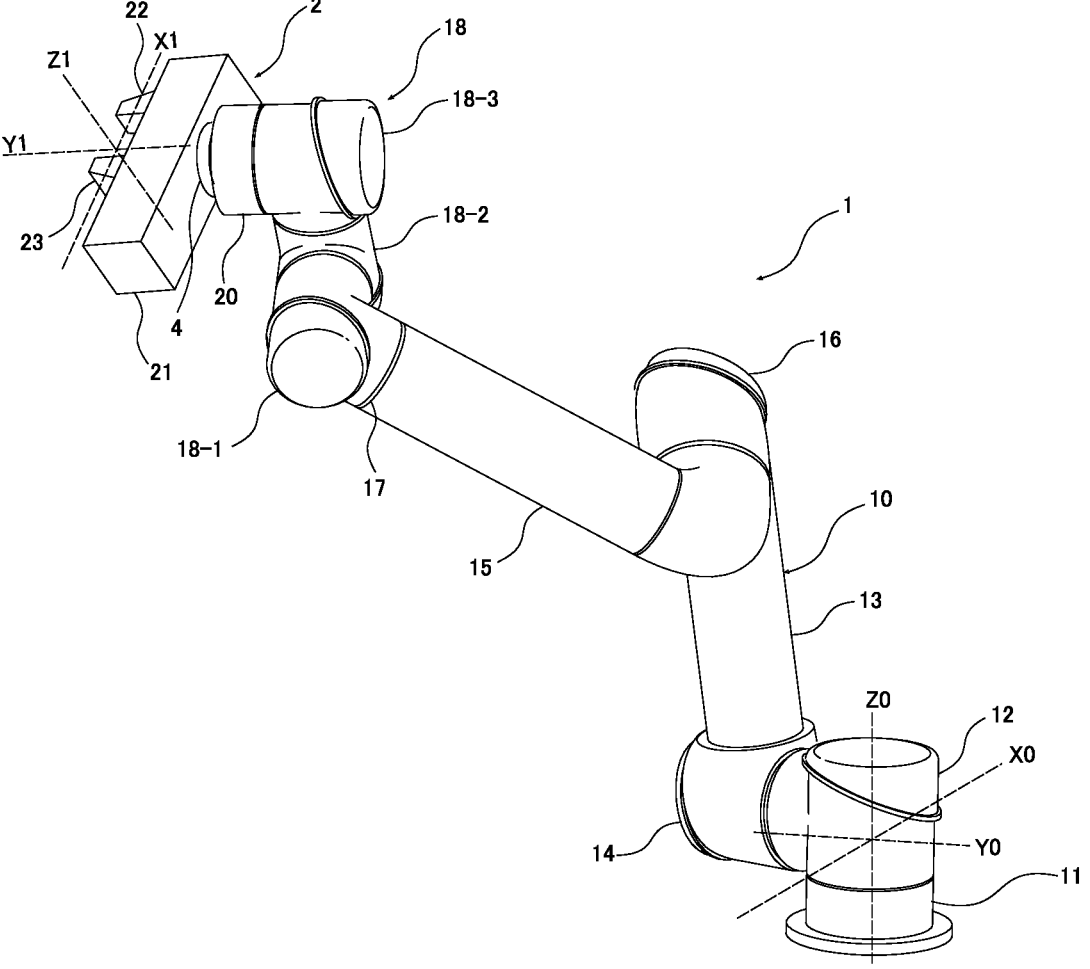
FIG. 1 is a perspective view of a robot device of a robot system according to an embodiment.

A robot system according to one aspect of the present disclosure includes a robot device for supplying a workpiece to a machine tool, a workpiece gripping mechanism attached to a distal end of an arm of the robot device, a force sensor for detecting an external force applied to the workpiece gripping mechanism, and a control device for controlling the robot device. The control device includes a control unit for controlling the robot device to correct a position and posture of the workpiece gripping mechanism with respect to the machine tool, based on an output of the force sensor, and a storage unit to store data relating to the corrected position and posture of the workpiece gripping mechanism.

An embodiment of the present disclosure will be described below with reference to the drawings. In the following description, constituent elements having substantially the same function and configuration are denoted by the same reference numeral, and repetitive descriptions will be given only where necessary.

As shown in FIG. 1, a robot device 1 constituting a robot system according to the present embodiment includes an articulated arm mechanism 10. The articulated arm mechanism 10 is provided by a vertically articulated type having, for example, six axes of freedom, and a rotary joint 12 for turning is installed on a base 11. To the rotary joint 12, a rotary joint 14, a link 13, a rotary joint 16, a link 15, a rotary joint 17, and a wrist part 18 composed of rotary joints 18-1, 18-2, and 18-3 with three orthogonal axes are sequentially connected. The articulated arm mechanism 10 is not limited to the vertically articulated type, but may be a rotary joint mechanism of another type, such as a polar coordinate type or a scalar type. A coordinate system based on the base 11 is referred to as a robot coordinate system (X0, Y0, Z0).

A mount 20 is attached to the wrist part 18. A work gripping mechanism (hereinafter referred to as a hand) 2 as an end effector is attached to the mount 20 via a force sensor 4.

The hand 2 has a pair of fingers 22 and 23, and a hand body 21 that supports the pair of fingers 22 and 23 in such a manner that the pair of fingers 22 and 23 can be opened and closed in an interlocking manner. Here, an orthogonal coordinate system based on the hand 2 is referred to as a hand coordinate system (X1, Y1, Z1). The hand coordinate system (X1, Y1, Z1) has, for example, the gripping center of the fingers 22 and 23 as the origin, a Z1 axis defined parallel to the front-rear direction of the hand 2, and an X1 axis and a Y1 axis defined as two axes orthogonal to the Z1 axis.

An operation control unit to be described later calculates displacement angles of the rotary joints 12, 14, 16, 17, 18-1, 18-2, and 18-3 and the trajectory of a hand reference point (for example, the origin of the hand coordinate system) in accordance with a task program described in, for example, the robot coordinate system (X0, Y0, Z0) to control the rotations of the rotary joints 12, 14, 16, 17, 18-1, 18-2, and 18-3 and control the opening and closing of the chuck of the chuck mechanism 3, and executes various types of processing such as converting the position and posture in the hand coordinate system (X1, Y1, Z1) into representations in the robot coordinate system (X0, Y0, Z0). The task program describes a workpiece supply procedure, and operations of, for example, picking up a workpiece W, moving the workpiece W to an approach position to the chuck mechanism 3, and setting the posture to an approach posture, pressing the workpiece W against the chuck surface 34 of the chuck mechanism 3, correcting the posture of the workpiece W together with the hand 2, closing the chuck of the chuck mechanism 3, correcting the position of the workpiece W, and disengaging the hand 2 from the chuck mechanism 3 are executed in this order.

The force sensor 4 detects the external force applied to the hand 2 by separating the external force into an external force component applied parallel to the X1 axis, an external force component applied parallel to the Y1 axis, and an external force component applied parallel to the Z1 axis. The force sensor 4 may detect the torques around the respective X1, Y1, and Z1 axes as the external force applied to the hand 2.

Figure 8:
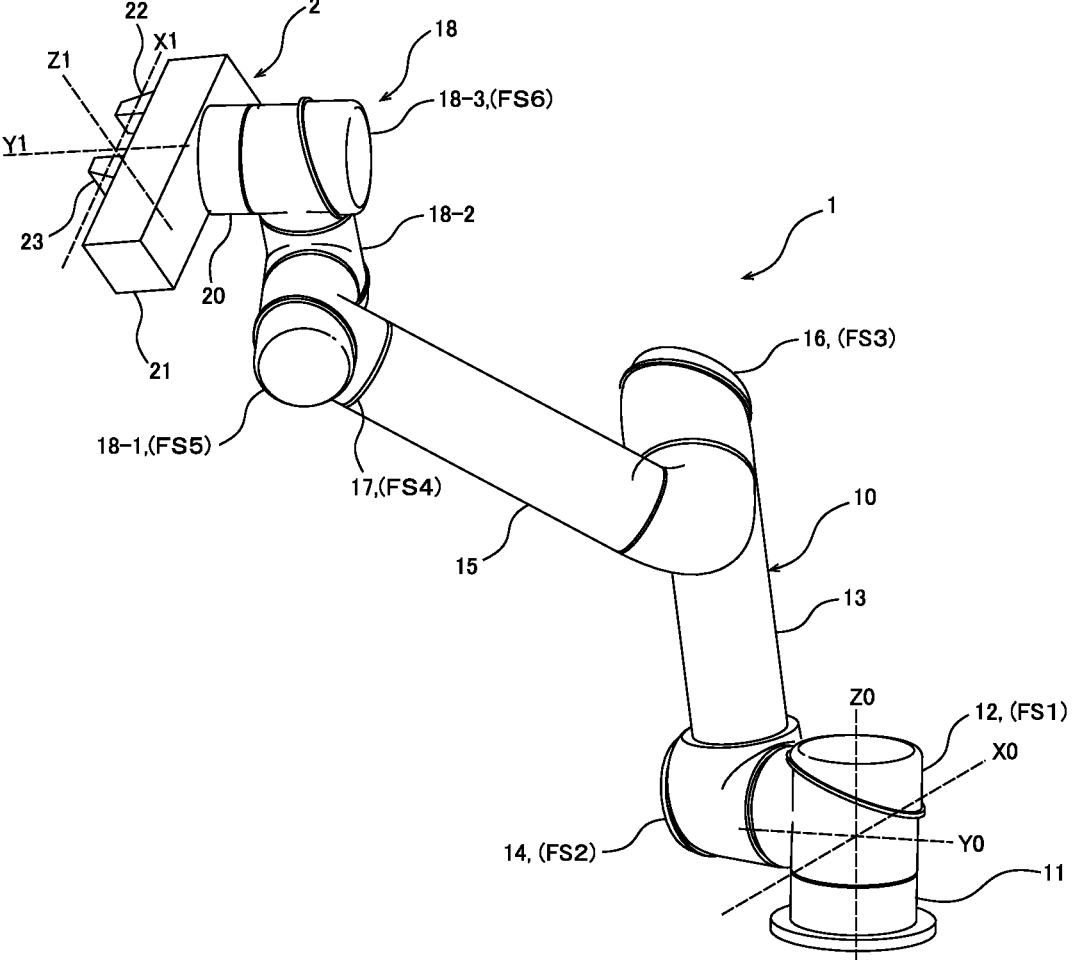
FIG. 8 is a perspective view of a robot device with a force sensor installed in a joint as a modification of the present embodiment.
Figure 9:
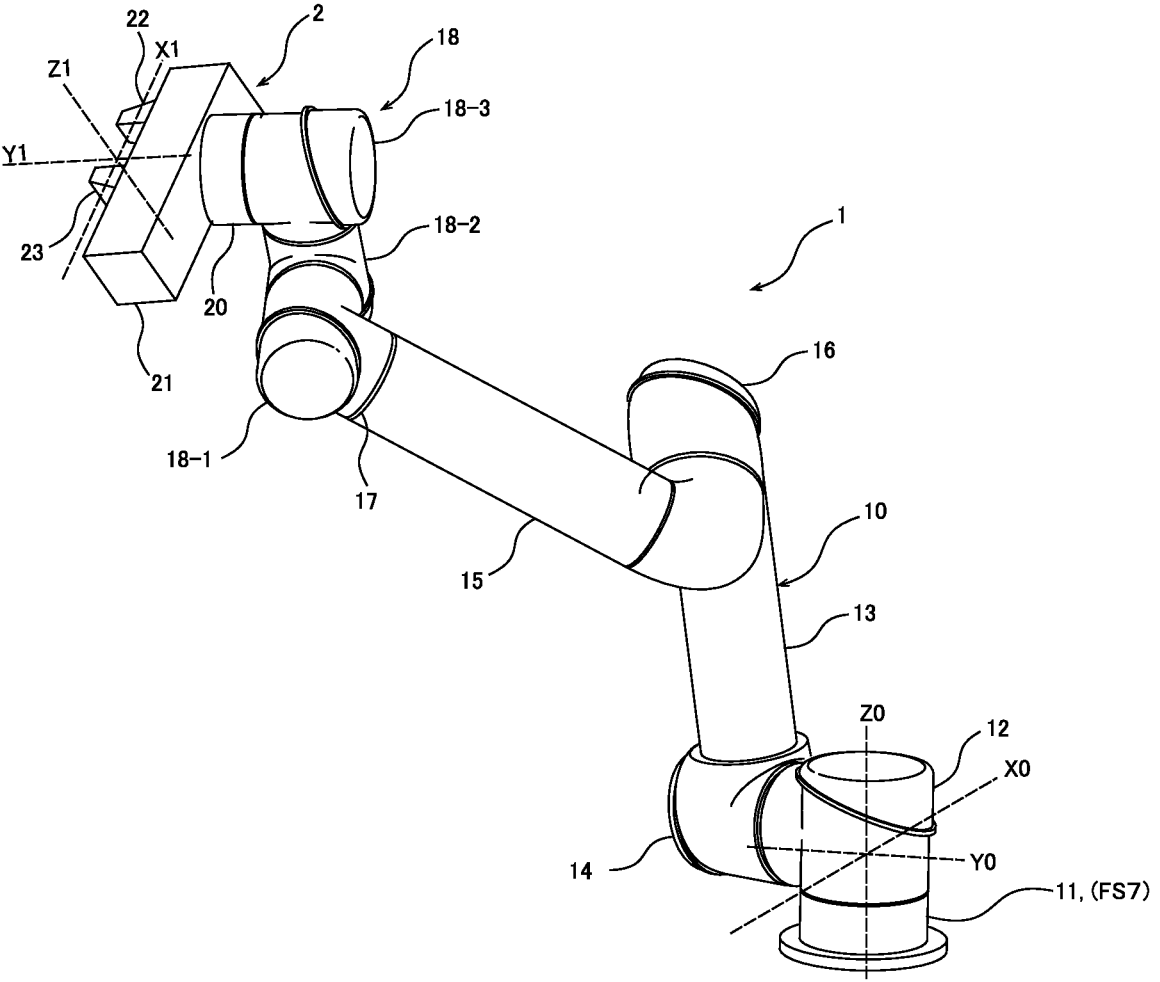
FIG. 9 is a perspective view of a robot device with a force sensor installed on a base as a modification of the present embodiment.

The force sensor 4 need not necessarily be located between the mount 20 and the workpiece gripping mechanism 2, and may be installed in at least one or more of the rotary joints 12, 14, 16, 17, 18-1, and 18-3 of the articulated arm mechanism 10, or may be mounted on the base 11, as long as the external force component applied parallel to the X1 axis, the external force component applied parallel to the Y1 axis, and the external force component applied parallel to the Z1 axis of the hand coordinate system to be described later can be acquired directly or indirectly through coordinate transformation processing. For example, as shown in FIG. 8, the force sensor 4 is installed at one or more positions near the torque sensors FS1 to FS6 of the rotary joints 12, 14, 16, 17, 18-1, and 18-3 of the articulated arm mechanism 10. Alternatively as shown in FIG. 9, the force sensor 4 is mounted at a position near a torque sensor FS7 on the base 11.

As shown in FIG. 2(*a*), FIG. 2(*b*), and FIG. 2(*c*), the workpiece W can be gripped by closing the fingers 22 and 23. The workpiece W gripped by the fingers 22 and 23 is moved by an operation of the articulated arm mechanism 10 and supplied to the chuck mechanism 3 of the machine tool 5. In the chuck mechanism 3, three claw parts 31, 32, and 33 are supported on the base 30 in such a manner that the three claw parts 31, 32, and 33 can approach and separate from each other in an interlocking manner. An orthogonal coordinate system based on the chuck mechanism 3 is referred to as a chuck coordinate system (X2, Y2, Z2). The chuck coordinate system (X2, Y2, Z2) has its origin at the center where the center lines of movement of the three craw parts 31, 32, and 33 intersect, a Y2 axis defined perpendicular to the chuck surface 34, and an X2 axis and a Z2 axis defined to be orthogonal to the Y2 axis at the origin. For convenience of description, a workpiece coordinate system (Xw, Yw, Zw) based on the workpiece W is defined. For example, if the workpiece W is cylindrical, the center of the workpiece W is defined as the origin, the center line thereof is defined as a Zw axis, and an Xw axis and a Yw axis are defined to be orthogonal to the Zw axis. Here, for convenience of description, the workpiece W is assumed to be cylindrical.

When the workpiece W is supplied to the chuck mechanism 3 of the machine tool 5, ideally, the workpiece W is moved to a position (approach position) where the Zw axis of the workpiece W coincides with the Z2 axis of the chuck mechanism 3 in a posture (approach posture) in which the Xw-Yw plane of the workpiece W is parallel to the X2-Y2 plane of the chuck mechanism 3, that is, the end surface of the workpiece W is parallel to the chuck surface 34 of the chuck mechanism 3 and, while maintaining the posture, moved parallel to the Z2 axis of the chuck mechanism 3 to approach the chuck surface 34 of the chuck mechanism 3 together with the hand 2, and restrained by the chuck mechanism 3 by closing the claw parts 31, 32, and 33 with the end surface of the workpiece W pressed against the chuck surface 34 to be brought into close contact with the chuck surface 34.

When the end surface of the workpiece W is pressed against the chuck surface 34, when the Xw-Yw surface of the workpiece W is not parallel to the X2-Y2 surface of the chuck mechanism 3, the force sensor 4 detects an external force component EF(Z1) applied parallel to the Z1 axis perpendicular to the chuck surface 34, an external force component EF(X1) applied parallel to the X1 axis, and an external force component EF(Y1) applied parallel to the Y1 axis. By rotating, based on the external force component EF(Y1), the hand 2 around the Y1 axis orthogonal to the external force component EF(X1) and rotating, based on the external force component EF(Y1), the hand 2 around the X1 axis orthogonal to the external force component EF(Y1), the external force component EF(X1) can be reduced and the external force component EF(Y1) can be reduced. Typically, the posture of the hand 2 is corrected so that both the external force component EF(X1) and the external force component EF(Y1) become zero or less than a predetermined threshold value.

The posture correction makes the end surface of the workpiece W parallel to the chuck surface 34. In this state, the end surface of the workpiece W is pressed against the chuck surface 34. At this time, the end surface of the workpiece W is brought into close contact with the chuck surface 34. When the claw parts 31, 32, and 33 of the chuck mechanism 3 is moved toward the center in an interlocking manner (chucking operation), if the center line (Zw axis) of the workpiece W is misaligned with the Z2 axis perpendicular to the chuck surface 34, the workpiece W is pushed eccentrically not evenly by the claw parts 31, 32, and 33. Therefore, the force sensor 4 detects the external force component EF(X1) applied parallel to the X1 axis and the external force component EF(Y1) applied parallel to the Y1 axis. The external force component EF(X1) can be reduced by moving the hand 2 parallel to the X1 axis based on the external force component EF(X1), and the external force component EF(Y1) can be reduced by moving the hand 2 parallel to the Y1 axis based on the external force component EF(Y1). Typically the position of the hand 2 is corrected so that both the external force component EF(X1) and the external force component EF(Y1) become zero or less than a predetermined threshold value. In this state, chucking is completed in the correct position and posture.

In the present embodiment, the approach position and the approach posture of the hand 2 are calculated based on the posture when the chucking is completed (chucking completion posture) and the position when the chucking is completed (chucking completion position) after the posture and the position are corrected as described above. In the simple case where the workpiece W can linearly approach the chuck surface 34, the approach posture coincides with the chucking completion posture, and the approach position is calculated as a position shifted by a predetermined distance in a direction away from the chuck surface 34 parallel to the Z2 axis with respect to the chucking completion position.

By moving a workpiece W to be supplied next to the workpiece W and subsequent workpieces W to the approach position calculated based on the chucking completion position in the approach posture calculated based on the chucking completion posture to press the workpiece W against the chuck surface, the correction of the position and posture of the hand 2 becomes unnecessary or the time required for the correction can be at least reduced compared with the case where the position and posture of the hand 2 are corrected after the workpiece W is moved to the taught approach position in the taught approach posture. Therefore, it is possible to shorten the cycle time of workpiece supply. Further, the external forces applied to the workpiece W, the hand 2, the articulated arm mechanism 10, and the chuck mechanism 3 can be reduced, and the gap between the workpiece W and the chuck surface 34 of the machine tool 5 can be reduced.

Figure 3:
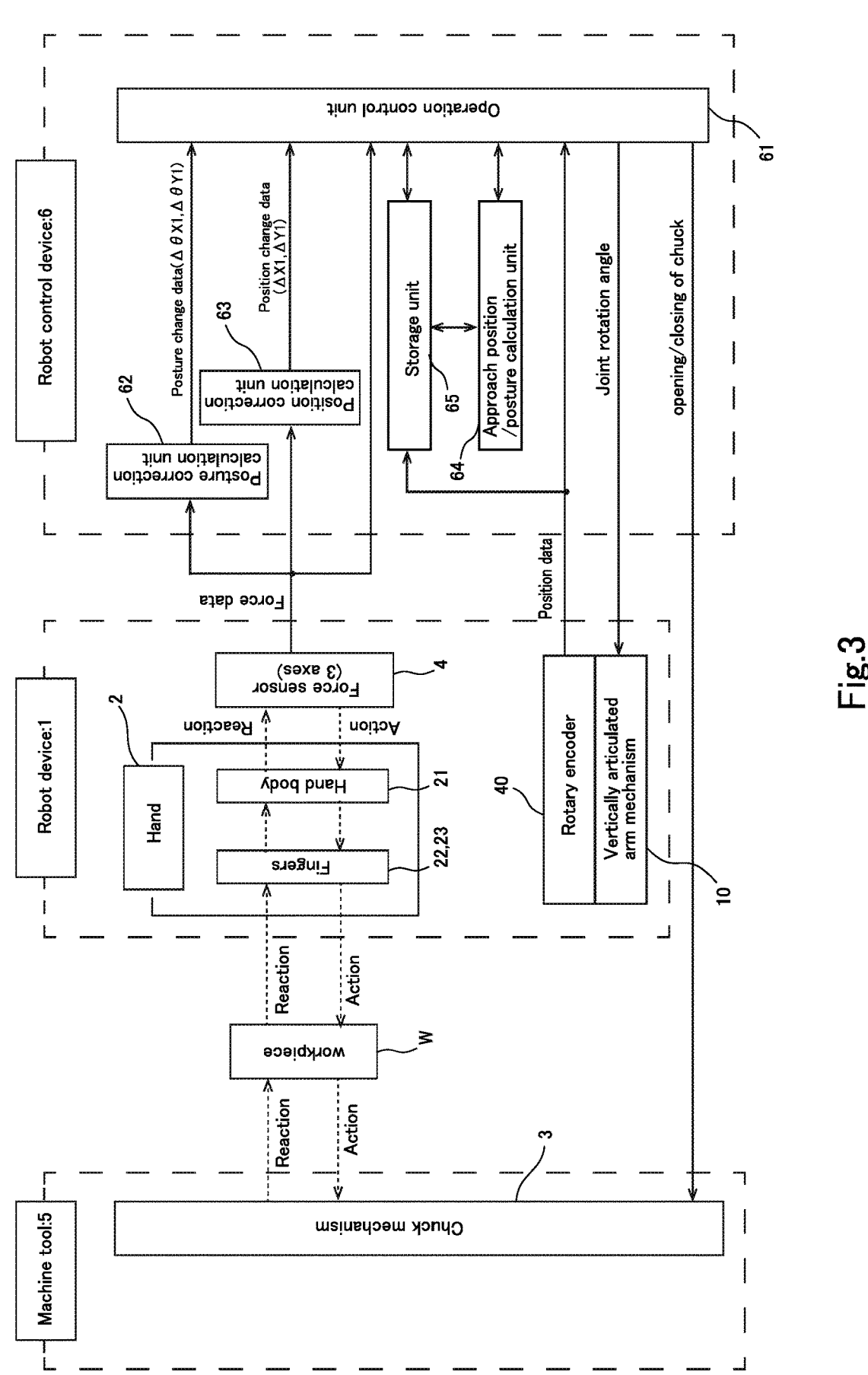
FIG. 3 is a mechanical block diagram of the robot system according to an embodiment.

As shown in FIG. 3, the robot system according to the present embodiment includes the robot device 1 described above and a robot control device 6 for controlling the robot device 1. The robot device 1 includes a rotary encoder 40 in addition to the articulated arm mechanism 10, the hand 2, and the force sensor 4. The rotary encoder 40 individually detects the rotation angles of the rotary joints 12, 14, 16, 17, 18-1, 18-2, and 18-3 of the articulated arm mechanism 10. The origin position of the hand coordinate system in the robot coordinate system can be calculated by forward kinematics from the rotation angles of the rotary joints 12, 14, 16, 17, 18-1, 18-2, and 18-3 detected by the rotary encoder 40. Here, for convenience of description, the rotation angles of the rotary joints 12, 14, 16, 17, 18-1, 18-2, and 18-3 detected by the rotary encoder 40 or a set of data representing the rotation angles will be simply referred to as position data. The position data is supplied to an operation control unit 61 for controlling the operation of the articulated arm mechanism 10.

The operation control unit 61 rotates the rotary joints 12, 14, 16, 17, 18-1, 18-2, and 18-3 and opens and closes the chuck mechanism 3 under feedback control using position data and force data in accordance with a task program describing a series of operations of moving the hand 2 to a workpiece stocker (not shown), gripping a workpiece W with the hand 2 and picks it up from the workpiece stocker, moving the hand 2 to an approach position in an approach posture, moving the hand 2 to press the workpiece W against the chuck surface 34, closing the claw parts 31, 32, and 33 of the chuck mechanism 3, releasing the workpiece W from the hand 2, together with the positions, postures, and trajectories.

The position data is also supplied to a storage unit 65, and is stored with a status code, such as chucking completed, supplied from the operation control unit 61. An approach position/posture calculation unit 64 calculates the approach position and approach posture of the hand 2 based on the data of the chucking completion posture and the chucking completion position stored in the storage unit 65.

The force sensor 4 detects an external force applied to the hand 2 for each of the three orthogonal axes (X1, Y1, Z1), and outputs data representing the external force components EF(X1), EF(Y1), EF(Z1) (these are collectively referred to as force data). The force data is supplied to the operation control unit 61, a posture correction calculation unit 62, and a position correction calculation unit 63.

The posture correction calculation unit 62 determines posture correction data for rotating the hand 2 by a minute unit angle ($\Delta\theta Y1$) in a direction corresponding to the polarity of the external force component EF(X1) around the Y1 axis orthogonal to the X1 axis so as to reduce the external force component EF (X1) applied parallel to the X1 axis and similarly determines posture correction data for rotating the hand 2 by a minute unit angle ($\Delta\theta X1$) in a direction corresponding to the polarity of the external force component EF(Y1) around the X1 axis orthogonal to the Y1 axis so as to reduce the external force component EF(Y1) applied parallel to the Y1 axis, and supplies the data to the operation control unit 61. The operation control unit 61 calculates the rotation angles of the rotary joints 12, 14, 16, 17, 18-1, 18-2, and 18-3 for achieving the rotation of the hand 2 by $\Delta\theta Y1$ and the rotation of the hand 2 by $\Delta\theta X1$ while maintaining the origin of the hand coordinate system in the robot coordinate system, and controls the actuators of the rotary joints 12, 14, 16, 17, 18-1, 18-2, and 18-3 so that the rotary joints 12, 14, 16, 17, 18-1, 18-2, and 18-3 rotate by the calculated rotation angles. The rotation of the unit angle ($\Delta\theta Y1$) and the unit angle ($\Delta\theta X1$) is repeated until the external force component EF(X1) and the external force component EF(Y1) become zero or less than a predetermined threshold value.

The position correction calculation unit 63 determines position correction data for moving the hand 2 by a minute unit distance ($\Delta X1$) in a direction parallel to the X1 axis and in which the external force component EF (X1) is applied so as to reduce the external force component EF(X1) applied parallel to the X1 axis and similarly determines position correction data for moving the hand 2 by a minute unit distance ($\Delta Y1$) in a direction parallel to the Y1 axis and in which the external force component EF(Y1) is applied so as to reduce the external force component EF(Y1) applied parallel to the Y1 axis, and supplies the data to the operation control unit 61. The operation control unit 61 calculates the rotation angles of the rotary joints 12, 14, 16, 17, 18-1, 18-2, and 18-3 for achieving the movement of the hand 2 by $\Delta X$ and the movement of the hand 2 by $\Delta Y1$ so that the hand coordinate system in the robot coordinate system is translated, and controls the actuators of the rotary joints 12, 14, 16, 17, 18-1, 18-2, and 18-3 so that the rotary joints 12, 14, 16, 17, 18-1, 18-2, and 18-3 rotate by the calculated rotation angles. The movement of the unit distance ($\Delta X1$) and the unit distance ($\Delta Y1$) is repeated until the external force component EF(X1) and the external force component EF(Y1) become zero or less than a predetermined threshold value.

Figure 4:
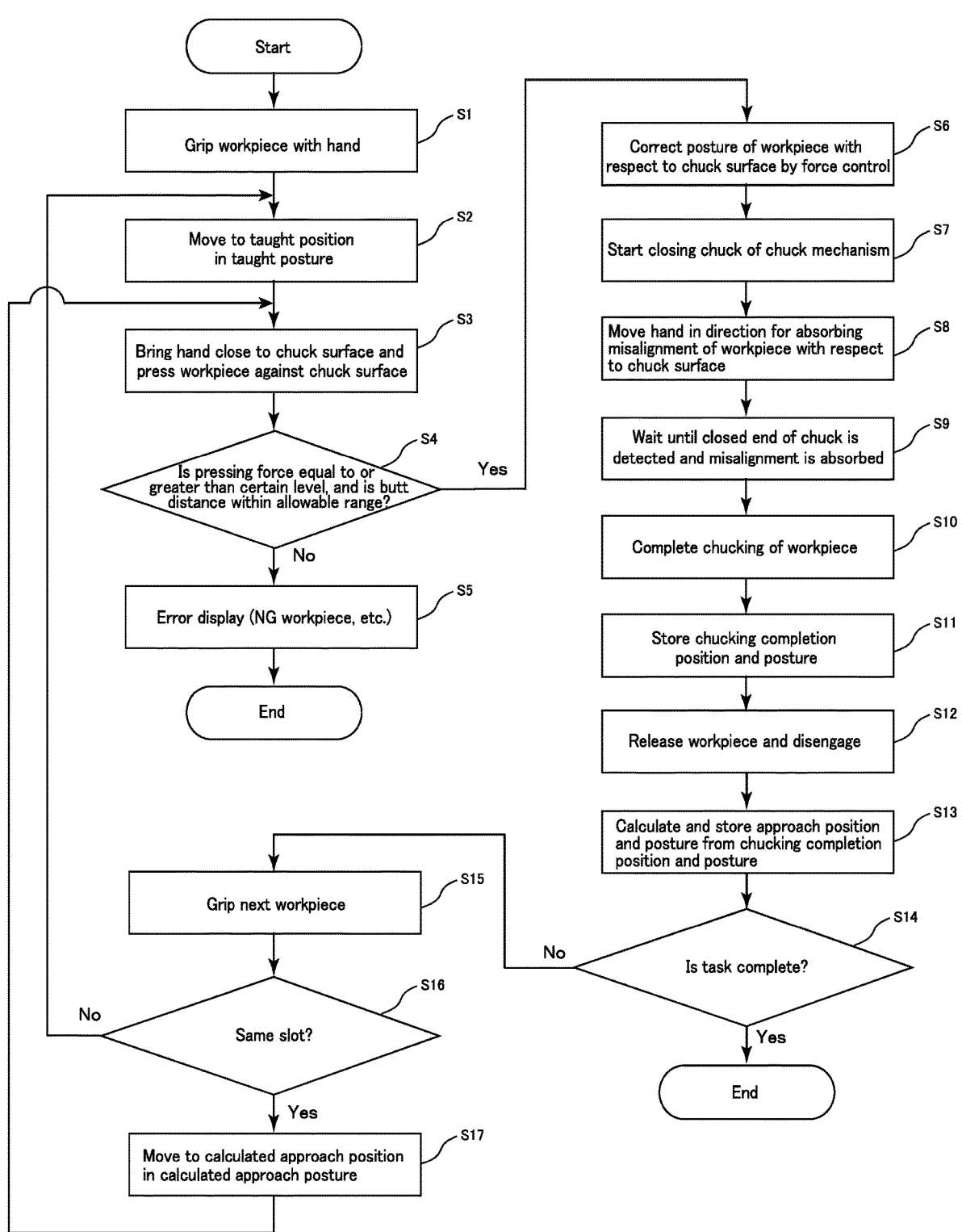
FIG. 4 is a flowchart showing a workpiece supply procedure under the control of the operation control unit shown in FIG. 1.

FIG. 4 shows a workpiece supply procedure by the operation control unit 61. The operation control unit 61 controls the rotary joints 12, 14, 16, 17, 18-1, 18-2, and 18-3 to move the hand 2 to the work stocker (not shown), and grips a workpiece W with the hand 2 (S1). As shown in FIG. 5($a$), the hand 2 is moved to a pre-taught approach position (X00, Y00, Z00) in a pre-taught approach posture ($\theta$X00, $\theta$Y00, $\theta$Z00) (S2). As shown in FIG. 5($b$), the hand 2 is moved parallel to the Z2 axis in a direction toward the chuck surface 34, and the workpiece W is pressed against the chuck surface 34 (S3). At this time, to prevent the workpiece W from being pressed against the chuck surface 34 with an excessively strong force, force control is performed so that the external force component EF(Z1) applied parallel to the Z1 axis does not exceed a critical threshold value.

During this pressing, the operation control unit 61 compares the force (pressing force) parallel to the Z2 axis from the external force components EF(Z1), EF(X1), EF(Y1) with an appropriate threshold value, which is set lower than the critical threshold value, to determine whether or not the pressing force is equal to or greater than the appropriate threshold value. Further, the distance (butt distance) D between the position of the hand 2 when the workpiece W collides with the chuck mechanism 3 and the hand 2 stops and the planned position for completion of pressing is calculated to determine whether or not the butt distance D is within a predetermined allowable range (S4). When the pressing force does not reach the appropriate threshold value, a situation in which the gripping angle of the workpiece W by the hand 2 is excessive compared to the planned angle, a situation in which the tolerance of the shape and dimensions of the workpiece W is excessive, or the like is assumed. Further, when the butt distance D is out of the predetermined allowable range DA, as illustrated in FIG. 5(*c*), a situation in which the gripping position of the workpiece W by the hand 2 is excessive compared to the planned position or angle, a situation in which the tolerance of the shape and dimensions of the workpiece W is excessive, or the like is assumed. When either one or both of the following are determined: the pressing force does not reach the appropriate threshold value, and the butt distance D is out of the allowable range DA (NO in S4), an error message indicating that the workpiece W is NG or the like is displayed on a display (not shown) under the control of the operation control unit 61 (S5), and the operation is temporarily terminated to wait for a restart instruction from the user. When the pressing force is equal to or greater than the appropriate threshold value and the butt distance D is within the allowable range DA (YES in S4), the processing proceeds to the next step S6.

In step S6, when the end surface of the workpiece W is not parallel to the chuck surface 34 as shown in FIG. 5(*b*), the force sensor 4 detects the external force component EF(X1) applied parallel to the X1 axis and the external force component EF(Y1) applied parallel to the Y1 axis. The posture correction calculation unit 62 generates posture correction data for rotating the hand 2 by a minute unit angle (ΔθY1) in a direction corresponding to the polarity of the external force component EF(X1) around the Y1 axis orthogonal to the X1 axis so as to reduce the external force component EF(X1) applied parallel to the X1 axis, and supplies the generated posture correction data to the operation control unit 61. The operation control unit 61 controls the articulated arm mechanism 10 in accordance with the supplied posture correction data to rotate the hand 2 by the unit angle (ΔθY1) around the Y1 axis. Similarly, the posture correction calculation unit 62 generates posture correction data for rotating the hand 2 by a minute unit angle (ΔθX1) in a direction corresponding to the polarity of the external force component EF(Y1) around the X1 axis orthogonal to the Y1 axis so as to reduce the external force component EF(Y1) applied parallel to the Y1 axis, and supplies the generated posture correction data to the operation control unit 61. The operation control unit 61 controls the articulated arm mechanism 10 in accordance with the supplied posture correction data to rotate the hand 2 by the unit angle (ΔθX1) around the X1 axis. This posture correction processing is repeated until the external force component EF(X1) and the external force component EF(Y1) become zero or less than a predetermined threshold value. As a result, as shown in FIG. 6(*a*), the end surface of the workpiece W becomes parallel to the chuck surface 34, and the end surface of the workpiece W is brought into close contact with the chuck surface 34.

In the next step S7, a chuck closing control signal is supplied from the operation control unit 61 to the chuck mechanism 3. As a result, the claw parts 31, 32, and 33 of the chuck mechanism 3 move toward the center in an interlocking manner. At this time, as shown in FIG. 6(*a*), when the workpiece W is misaligned with the chuck surface 34, that is, when the center line (Zw axis) of the workpiece W is misaligned with the Z2 axis of the chuck mechanism 3, the workpiece W is not pushed evenly by the claw parts 31, 32, and 33, but is pushed eccentrically. Thus, the force sensor 4 detects the external force component EF(X1) applied parallel to the X1 axis and the external force component EF(Y1) applied parallel to the Y1 axis. The position correction calculation unit 63 generates position correction data for moving the hand 2 by a minute unit distance (ΔX1) in a direction parallel to the X1 axis in which the external force component EF(X1) is applied, that is, a direction for absorbing the misalignment, so as to reduce the external force component EF(X1) applied parallel to the X1 axis, and supplies the generated position correction data to the operation control unit 61. As shown in FIG. 6(*b*), the operation control unit 61 controls the articulated arm mechanism 10 in accordance with the supplied position correction data to move the hand 2 by the unit distance (ΔX1) parallel to the X1 axis. Similarly, the position correction calculation unit 63 generates position correction data for moving the hand 2 by a minute unit distance (ΔY1) in a direction parallel to the Y1 axis in which the external force component EF(Y1) is applied, that is, a direction for absorbing the misalignment, so as to reduce the external force component EF(Y1) applied parallel to the Y1 axis, and supplies the generated position correction data to the operation control unit 61. The operation control unit 61 controls the articulated arm mechanism 10 in accordance with the supplied position correction data to move the hand 2 by the unit distance (ΔY1) parallel to the Y1 axis. This position correction processing is repeated until the external force component EF(X1) and the external force component EF(Y1) become zero or less than a predetermined threshold value. As a result, as shown in FIG. 6(*b*), the center line Zw of the workpiece W coincides with the Z2 axis of the chuck mechanism 3. When the misalignment is absorbed in this way and a chuck closed end detection signal is received from the chuck mechanism 3 (S9), the operation control unit 61 determines completion of the supply of the workpiece W to the chuck mechanism 3 (S10).

When the supply of the workpiece W to the chuck mechanism 3 is completed, a chuck status code is supplied from the operation control unit 61 to the storage unit 65. The position data at that time is attached with a status code of completion of chucking, and is stored in the storage unit 65 (S11). As shown in FIG. 6(*c*), the operation control unit 61 controls the hand 2 to release the workpiece W, and controls the articulated arm mechanism 10 to disengage the hand 2 from the workpiece W restrained by the chuck mechanism 3 (S12).

Next, in step S13, as shown in FIG. 7, the approach position/posture calculation unit 64 calculates a chucking completion position (X01, Y01, Z01) and a chucking completion posture (θX01, θY01, θZ01) in the robot coordinate system, based on the position data (joint angle data set) at the time of completion of chucking stored in the storage unit 65, calculates the approach position and the approach posture of the hand 2 from the chucking completion position (X01, Y01, Z01) and the chucking completion posture (θX01, θY01, θZ01), and stores them in the storage unit 65. As the approach posture, for example, the chucking completion posture (θX01, θY01, θZ01) is maintained, and as the approach position, for example, a position obtained by shifting the chucking completion position (X01, Y01, Z01) by a predetermined distance in a direction away from the chuck surface parallel to the Z2 axis perpendicular to the chuck surface 34 is calculated.

In step S14, the operation control unit 61 determines whether or not the number of supplied workpieces W has reached the planned number, and when it is determined that the number of supplied workpieces W has reached the planned number, the task is considered complete (YES in S14), and the processing is terminated. When the number of supplied workpieces W has not reached the planned number (NO in S14), the next workpiece W is gripped by the hand 2 (S15). For example, the lot number of the workpiece W is read, and it is determined whether or not the workpiece W has the same lot number as the first workpiece W subjected to the posture correction and the position correction. The same lot number indicates that those workpieces W were manufactured under the same conditions, and there is a high possibility that the outer dimensions, materials, and the like of the workpieces W are relatively uniform.

When the next workpiece W has the same lot number as the first workpiece W subjected to the posture correction and the position correction (YES in S16), the approach position and approach posture calculated in step S13 based on the chucking completion position and the chucking completion posture after the position correction and the posture correction are applied, instead of the taught approach position and taught approach posture. The hand 2 gripping the workpiece W is moved to the calculated approach position in the calculated approach posture (S17). Then, the processing returns to step S3, and the hand 2 approaches the chuck surface 34 from that position and posture, and the workpiece W is pressed against the chuck surface 34.

Since the next workpiece W was manufactured in the same lot as the workpiece W subjected to the position correction and the posture correction, the tolerance of the outer dimensions is relatively similar, and since the workpieces W are often neatly lined up in the same state in the stocker and the gripping misalignment is also often similar, the posture correction in step S6 and the position correction in step S8 are substantially unnecessary. Alternatively the time required for the corrections is at least shorter than the case where the position and posture of the hand 2 are corrected after the hand 2 has moved to the taught approach posture and the taught approach position. Therefore, the cycle time of the workpiece supply can be shortened. Further, even when the position correction and the posture correction are performed, the correction amount is smaller than that in the case where the position and posture of the hand 2 are corrected after the hand 2 has moved to the taught approach posture and the taught approach position. This reduces the external forces applied to the workpiece W, the hand 2, the articulated arm mechanism 10, and the chuck mechanism 3, thereby suppressing wear and tear on them. In addition, the gap between the workpiece W and the chuck surface 34 of the chuck mechanism 3 of the machine tool 5 can be reduced to eliminate the deterioration of machining accuracy.

That is, the taught approach posture and the taught approach position are set in advance using a master workpiece W, and there is no guarantee that the master workpiece W for teaching is in the center of the tolerances of workpieces W used in actual mass production, and when the master workpiece W is not in the center of the tolerances of workpieces used in mass production, the error needs to be corrected each time during mass production, and the cycle time is increased by the correction time. However, after the position correction and the posture correction are performed on a workpiece W, the approach position and approach posture calculated from the corrected chucking completion position and chucking completion posture are applied as the approach position and approach posture for workpieces W manufactured in the same lot, thereby reducing the correction time.

In step S16, when the lot number of a workpiece W is different from the lot number of the workpiece W subjected to the position correction and the posture correction, that is, when the workpiece W is manufactured in another lot, the processing returns to step S2 on the assumption that the tolerance and the gripping misalignment are different from those of the workpiece W subjected to the position correction and the posture correction, the workpiece W is moved to the taught approach position in the taught approach posture, and subjected to position correction and posture correction from that position and posture.

Although it is described that the same approach posture and approach position are applied to the workpieces W in the same lot, the present disclosure is not limited to this, and the approach posture and approach position may be calculated based on the chucking completion position and chucking completion posture of the immediately preceding workpiece W, the approach posture and approach position may be applied to the current workpiece W, and the approach posture and approach position may be calculated and applied repeatedly in this manner.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot system comprising:
   a robot for supplying a workpiece to a machine tool;
   a workpiece gripping mechanism attached to a distal end of an arm of the robot;
   a force sensor for detecting an external force applied to the workpiece gripping mechanism when the workpiece is pressed against the machine tool; and
   a processor for controlling the robot to correct a position and posture of the workpiece gripping mechanism with respect to the machine tool so as to reduce the external force detected by the force sensor,
   wherein:
   the processor calculates, based on the corrected position and posture of the workpiece gripping mechanism, an approach position and an approach posture serving as a starting point for approaching the machine tool;
   the processor controls the robot to move the workpiece gripping mechanism toward the machine tool from the calculated approach position and approach posture when a lot number of a next workpiece following the workpiece is the same as a lot number of the workpiece; and the processor controls the robot to move the workpiece gripping mechanism toward the machine tool from a pre-taught approach position and approach posture when the lot number of the next workpiece is different from the lot number of the workpiece.

2. The robot system according to claim 1, wherein the processor controls the robot based on the output of the force sensor to move the workpiece gripping mechanism parallel to a vertical centerline of a chuck surface of a chuck mechanism of the machine tool, correct the posture of the workpiece gripping mechanism so as to reduce a force applied in a direction orthogonal to the vertical centerline while pressing the workpiece against the chuck surface with a predetermined force, and correct the position of the workpiece gripping mechanism along the direction orthogonal to the vertical centerline so as to reduce the force applied in the direction orthogonal to the vertical centerline as the chuck mechanism is closed.

3. A workpiece supply method for supplying a workpiece to a machine tool by a robot system including a robot, a workpiece gripping mechanism attached to a distal end of an arm of the robot, a force sensor for detecting an external force applied to the workpiece gripping mechanism, and a processor for controlling the robot, the workpiece supply method comprising:

controlling, by the processor, the robot and the workpiece gripping mechanism to grip the workpiece with the workpiece gripping mechanism and press the workpiece against the machine tool;

controlling, by the processor, the robot to correct a position and posture of the workpiece gripping mechanism so as to reduce an external force detected by the force sensor applied to the workpiece gripping mechanism by pressing the workpiece against the machine tool;

calculating, by the processor, an approach position and an approach posture serving as a starting point for approaching the machine tool, based on the corrected position and posture of the workpiece gripping mechanism;

when a lot number of a next workpiece following the workpiece is the same as a lot number of the workpiece that was immediately previously supplied, controlling, by the processor, the robot to move the workpiece gripping mechanism to the approach position and approach posture calculated for the workpiece that was immediately previously supplied, and then approach the machine tool; and when the lot number of the next workpiece is different from the lot number of the workpiece that was immediately previously supplied, controlling, by the processor, the robot to move the workpiece gripping mechanism to a pre-taught approach position and approach posture instead of the approach position and approach posture calculated for the workpiece that was immediately previously supplied, and then approach the machine tool.

4. The workpiece supply method according to claim 3, further comprising:

calculating, by the processor, an approach position and approach posture of the workpiece gripping mechanism with respect to the machine tool, based on the corrected position and posture of the workpiece gripping mechanism; and controlling, by the processor, the robot to apply the calculated approach position and approach posture to another workpiece following the workpiece.

* * * * *